United States Patent [19]

Fujioka et al.

[11] Patent Number: 4,891,588

[45] Date of Patent: Jan. 2, 1990

[54] DEVICE FOR DETECTING ROTATION SPEED HAVING FEEDBACK CIRCUITRY AND IMPROVED FREQUENCY-RESPONSE

[75] Inventors: Souichiro Fujioka, Sakai; Hiroshi Okamoto, Nara, both of Japan

[73] Assignee: Matsushita Electric Industrial Co., Ltd., Osaka, Japan

[21] Appl. No.: 213,620

[22] Filed: Jun. 30, 1988

[30] Foreign Application Priority Data

Jul. 1, 1987 [JP] Japan ............................ 62-164550
Jul. 1, 1987 [JP] Japan ............................ 62-164551

[51] Int. Cl.$^4$ ..................... G01P 3/481; G01R 23/02
[52] U.S. Cl. .................................. 324/166; 324/78 R; 364/565
[58] Field of Search ............... 324/160, 166, 78 R, 324/78 D, 78 E, 78 F; 364/565; 340/670–672; 341/13–15

[56] References Cited

U.S. PATENT DOCUMENTS 4,667,297 5/1987 Kawai .......................... 324/166

FOREIGN PATENT DOCUMENTS 2566132 12/1985 France ............................ 324/166
0023584 2/1979 Japan ............................... 324/166

OTHER PUBLICATIONS

"A Microprocessor-Controlled Speed Regulator with Instantaneous Speed Estimation for Motor Drives", K. Saito, T. Ohmae, and T. Matsuda, IECON'85—pp. 755–760.

Primary Examiner—Gerard R. Strecker
Attorney, Agent, or Firm—Wenderoth, Lind & Ponack

[57] ABSTRACT

In an apparatus for detecting a rotating speed of a rotating object, in which a pulse train having a frequency proportional to the rotating speed is generated and the rotating speed is detected by detecting the period of the pulse train, the period detection results are over-sampled to form a recursive filter having a peak at the frequency where the frequency characteristic of the period detecting operation becomes zero. As a result, the frequency characteristic of the apparatus as a whole does not have a peak. The phase delay due to the period detecting operation is reduced.

13 Claims, 10 Drawing Sheets

DEVICE FOR DETECTING ROTATION SPEED HAVING FEEDBACK CIRCUITRY AND IMPROVED FREQUENCY-RESPONSE

BACKGROUND OF THE INVENTION

1. Field of the Invention

The present invention relates to an apparatus for detecting a rotating speed of a rotating object such as a rotating motor.

2. Description of the Prior Art

In a conventional apparatus for detecting a rotating speed of a motor, a pulse train having a frequency proportional to the rotating speed is generated and the rotating speed is detected by measuring the period of the pulse train at occurrence of each pulse.

Generally, when a motor rotating speed is to be controlled, the rotating speed detecting apparatus is designed so that the phase delay thereof becomes at most 30 degrees in the controlled frequency range to insure the stability of the control system. Due to this requirement, the control frequency range of the rotation control system is limited to a range which is 1/12 of the frequency of the pulse train. In other words, the response speed of the system cannot be increased.

SUMMARY OF THE INVENTION

An object of the present invention is to improve the frequency characteristic, particularly the phase characteristic, of the conventional rotating speed detecting apparatus and considerably reduce the phase delay thereby to expand the controlled frequency range for controlling the rotating speed of a rotating object, while maintaining the required phase margin and gain margin for the stability of the control system.

In order to achieve the above object, a rotating speed detecting apparatus according to the present invention comprises: a first pulse generating means for generating a first pulse train having a frequency proportional to a rotating speed of a rotating object; a period detecting means for detecting a pulse period of the first pulse train; a latching means for latching the detected pulse period during the next one period of the first pulse train; a second pulse generating means for generating a second pulse train having a frequency which is m times (m: natural number equal to or greater than 2) the frequency of the first pulse train; a calculation means for carrying out a specified calculation of an output of the latching means; a delaying means for delaying a calculation result of the calculation means by one period of the second pulse train; and a multiplication means for multiplying an output of the delaying means by a specified value of less than 1, the calculation means subtracts, as the specified calculation, an output of the multiplication means from the output of the latching means.

Since the part consisting of the calculation means, the delaying means and the multiplication means constitutes a recursive filter having a kind of differential characteristic, the frequency characteristic, especially the phase characteristic, of the rotating speed detecting apparatus can be improved to thereby reduce the phase delay. Further, by coinciding a peak point of a frequency characteristic generated by the calculation means, the delaying means and the multiplication means with a zero point of a frequency characteristic generated by the period detecting means, it is possible to realize an overall frequency characteristic of the apparatus having no peaks. Therefore, if the rotating speed is controlled according to the present invention, it becomes possible to make the controlled frequency range 1.5 times that of the conventional apparatus while maintaining approximately the same phase margin and the gain margin required for the stability of the control system of the conventional apparatus.

DESCRIPTION OF THE PREFERRED EMBODIMENTS

Figure 1:
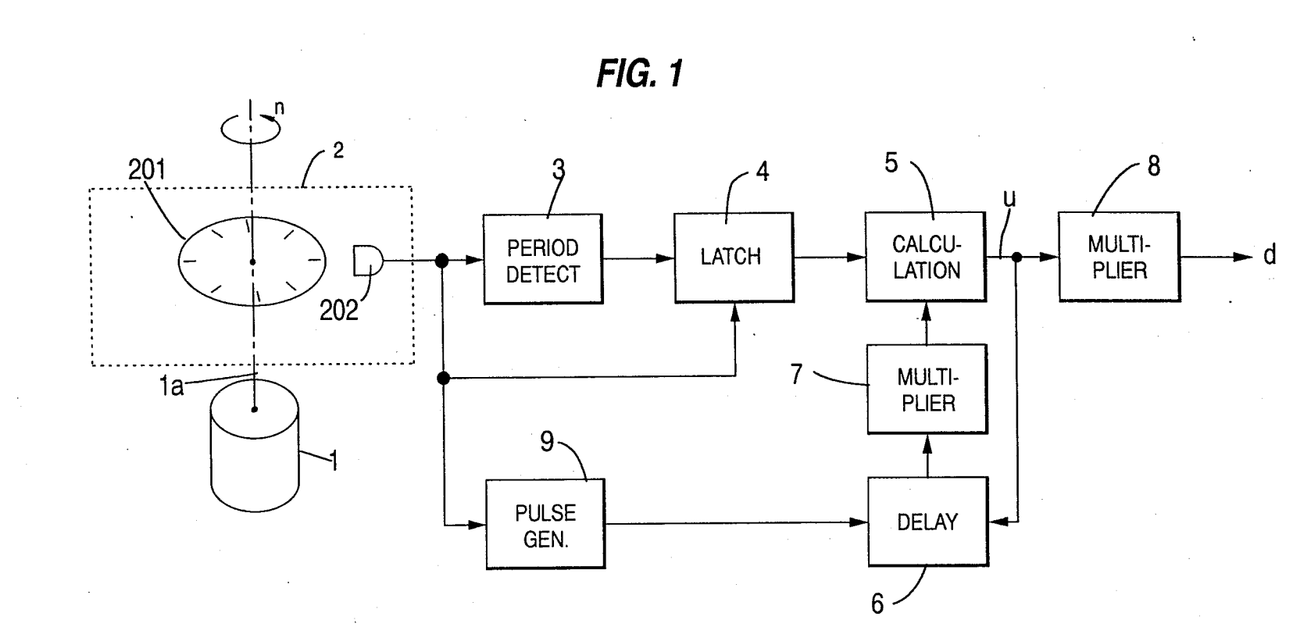
FIG. 1 is a block diagram of a rotating speed detecting apparatus embodying the present invention.

FIG. 1 shows an embodiment of the apparatus for detecting a rotating speed of a motor according to the present invention.

In FIG. 1, a pulse generating section 2 generates a first pulse train having a frequency proportional to a rotating speed n of a motor 1 and is comprised of an encoder 201 which rotates integrally with a rotating shaft 1a of the motor 1 and a photosensor 202. The pulse duty ratio of the first pulse train is about 0.5. A period detecting circuit 3 detects the period of the first pulse train outputted from the pulse generating section 2. A latching circuit 4 latches the value of the period detected by the period detecting circuit 3 until a next pulse of the first pulse train occurs. A pulse generating circuit 9 generates a second pulse train having a frequency two times (m=2) that of the first pulse train. The pulse generating circuit 9 outputs a pulse of almost constant amplitude at each leading edge and at each trailing edge of the first pulse train to thereby generate a second pulse train.

A calculation circuit 5 carries out a specified calculation as described later. A delaying circuit 6 delays a calculation result of the calculation circuit 5 by one period of the second pulse train outputted from the pulse generating circuit 9 at each occurrence of a pulse of the second pulse train. A multiplier 7 multiplies an output of the delaying circuit 6 by a specified value b (b is a real number less than 1). A multiplication result output of the multiplier 7 is inputted into the calculating circuit 5. The calculation circuit 5 subtracts the output of the multiplier 7 from the output of the latching circuit 4 and outputs the subtraction result as a rotating speed signal u indicative of the rotating speed of the motor 1. A multiplier 8 multiplies the rotating speed signal u by a specified value a (a is a real number) for adjusting the detection gain to obtain a signal d which represents a detected rotating speed.

Figure 2:
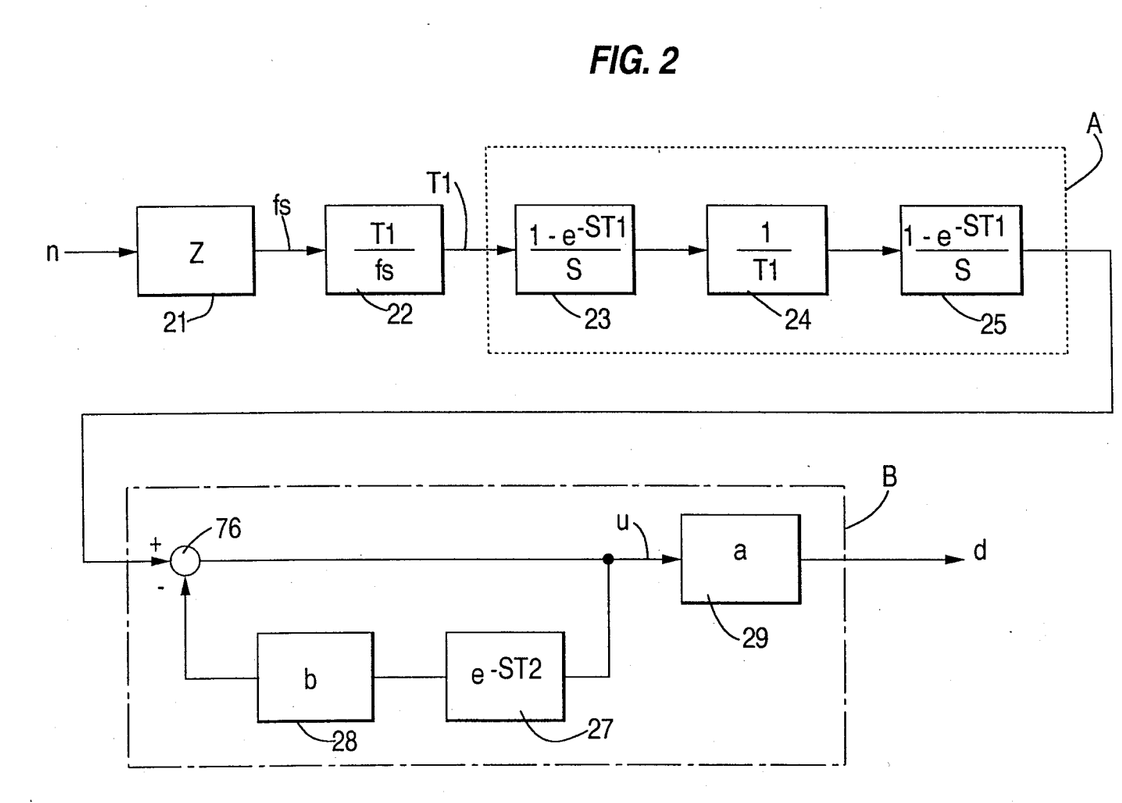
FIG. 2 is a block diagram representing the transfer characteristic of the apparatus of FIG. 1.

In the apparatus shown in FIG. 1, the transfer characteristic from the rotating speed n of the motor 1 to the detected rotating speed signal d can be represented by a block diagram as shown in FIG. 2. Block 21 represents the transfer characteristic of the pulse generating section 2, and block 22 represents the transfer characteristic which converts the frequency into the period. Block 23 represents the transfer characteristic of the detecting action of the period detecting circuit 3. Block 24 represents the transfer characteristic of the sampling action of the circuit 3. Block 25 represents the transfer characteristic of the latching circuit 4. Block 26 represents the calculation circuit 5. Block 27 represents the transfer characteristic of the delaying circuit 6. Block 28 represents the transfer characteristic of the multiplier 7. Block 29 represents the transfer characteristic of the multiplier 8. The symbol S is a Laplace operator and Z is the number of teeth of the encoder 201. The frequency fs is the frequency of the first pulse train generated by the pulse generating section 2, and the period T1 is the period of the first pulse train. The period T2 is the period of the second pulse train generated by the pulse generating circuit 9 and represents the delay time of the delaying circuit 6.

Figure 3A:
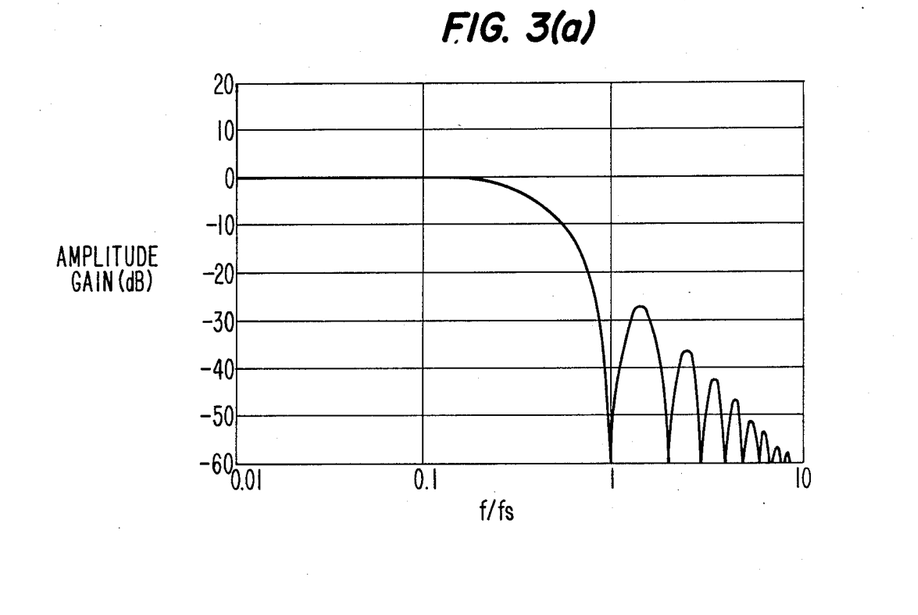
FIGS. 3(a) and 3(b) are Bode plots showing the frequency-response characteristic of block A in the block diagram of FIG. 2.
Figure 3B:
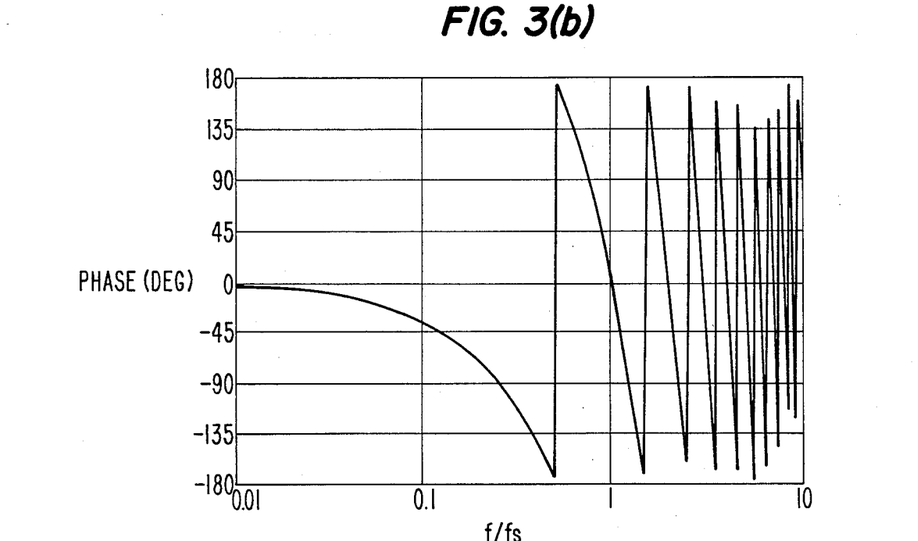

The frequency-response characteristic of block A consisting of the blocks 23–25 is shown in the Bode diagram of FIG. 3, in which (a) is an amplitude characteristic and (b) is a phase characteristic. In FIG. 3, the axis of the abscissa is normalized based on the frequency fs (=1/T1) of the first pulse train. The amplitude characteristic has a valley at the frequency fs of the first pulse train, and the phase is delayed in the frequency range from the low frequency area to the frequency fs.

Figure 4A:
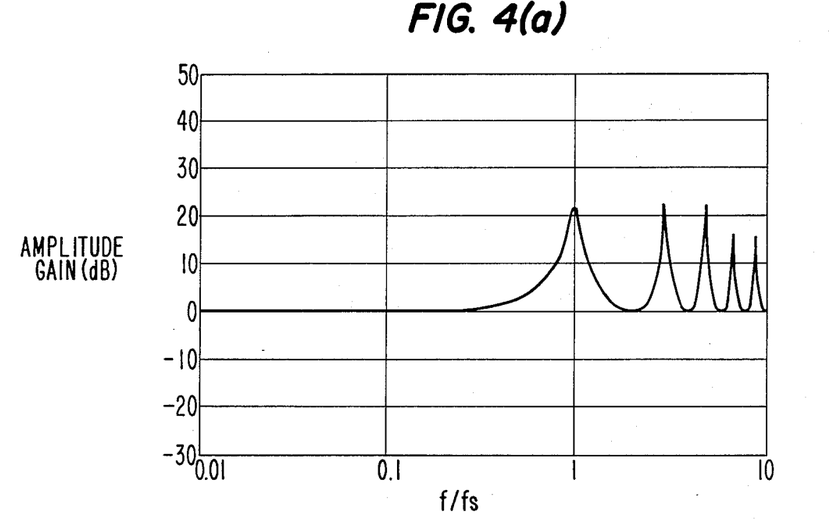
FIGS. 4(a) and 4(b) are Bode plots showing the frequency-response characteristic of block B in the block diagram of FIG. 2.
Figure 4B:
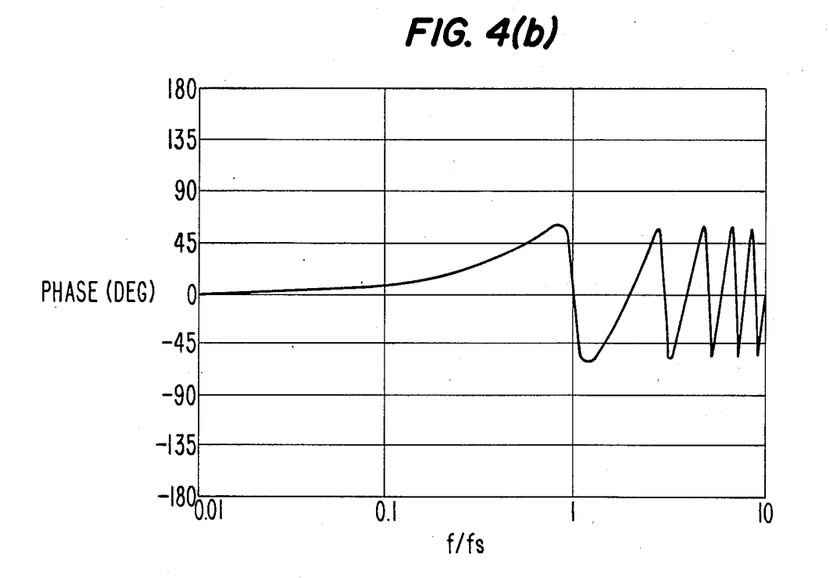

Now, when the frequency of the output pulse train of the pulse generating circuit 9 is selected at a frequency two times (m=2) the frequency of the output pulse train of the pulse generating section 2 as stated above and when the coefficients a and b of the multiplier 8 and multiplier 7 are set as a=1.875 and b=0.875, the frequency characteristic of the block B consisting of blocks 26–29 in the block diagram of FIG. 2 is represented by a Bode diagram as shown in FIG. 4, in which (a) denotes an amplitude characteristic and (b) denotes a phase characteristic. In FIG. 4, the axis of the abscissa is normalized based on the output pulse frequency fs (=1/T1) of the pulse generating section 2. As seen directly from the Bode diagram shown in FIG. 4, the amplitude characteristic has a peak at the frequency fs and the phase is advanced in the frequency range from the low frequency area to the frequency fs. In other words, both the gain and phase characteristics each have a kind of differential characteristic. This means that the block B in FIG. 2 is a kind of recursive filter having a differential characteristic.

Figure 5A:
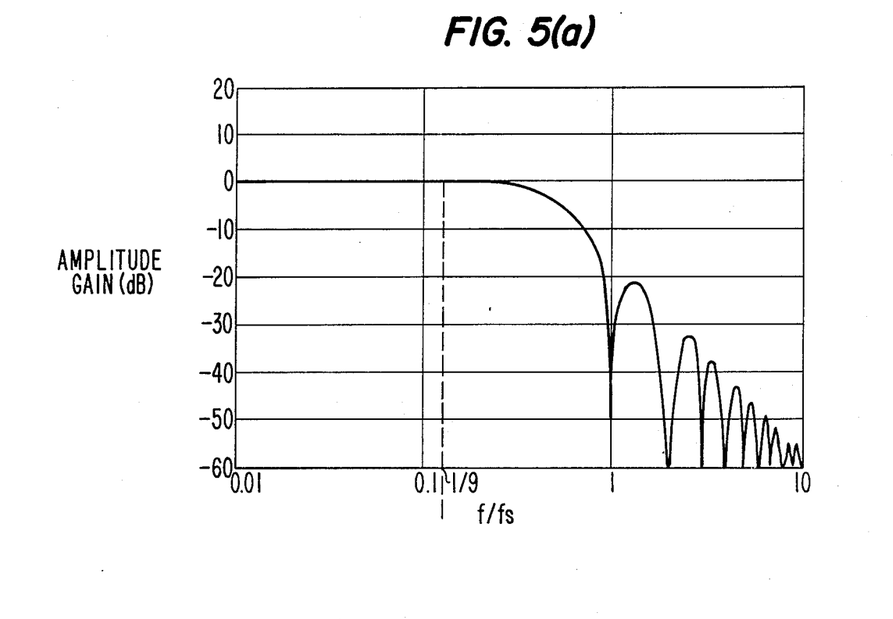
FIGS. 5(a) and 5(b) are Bode plots showing the frequency-response characteristic from T1 to d in the block diagram of FIG. 2.
Figure 5B:
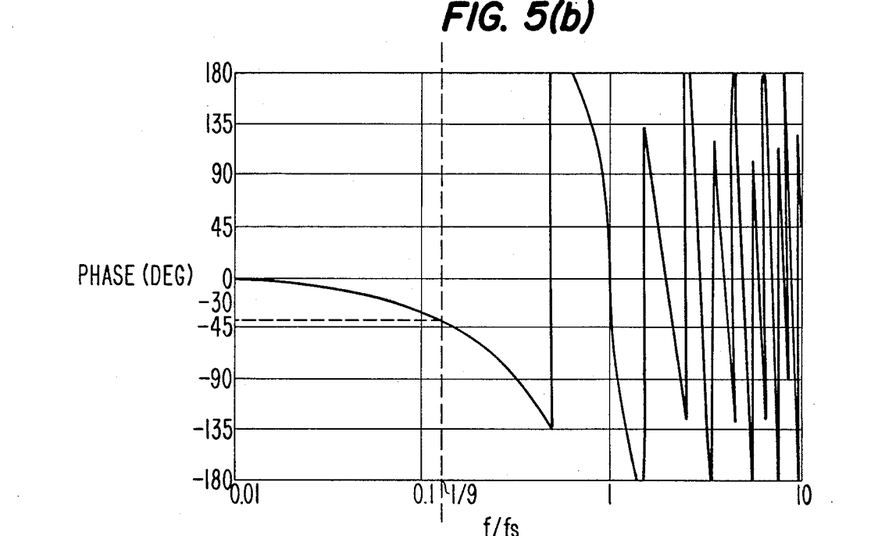

A Bode diagram of the transfer characteristic from the period T1 of the output pulse train of the pulse generating section 2 to the signal d is shown in FIG. 5, in which (a) denotes an amplitude characteristic and (b) denotes a phase characteristic. In FIG. 5, the axis of the abscissa is normalized based on the output pulse frequency fs (=1/T1) of the pulse generating section 2. From FIG. 5, it is understood that the frequency of the zero point on the frequency characteristic of block A (refer to FIG. 3) conicides with the frequency of the peak point on the frequency characteristic of block B (refer to FIG. 4), so that the rotating speed detecting apparatus as a whole has a good frequency characteristic which does not have a peak in the frequency range below fs.

It is further understood that the phase delay of the rotating speed detecting apparatus becomes 30° or less in a frequency range equal to or less than 1/9 of the frequency fs of the first pulse train generated by the pulse generating section 2. That is, in case the rotating speed detecting apparatus according to this embodiment of the present invention is to be used to compose a rotation control system which satisfies a phase margin of about 60 degrees and a gain margin of about 10 dB, it is possible to widen the controlled frequency range up to about 1/9 of the pulse frequency fs (=1/T1) of the pulse train generated by the pulse generating section 2, and thus a high response speed can be obtained.

In the above embodiment of the present invention, only the case of m=2 is described, but the value of m is not be limited to 2, but may be any natural number equal to or greater than 2. However, by using an even number as the value of m, the frequency at which the frequency characteristic of the block B in FIG. 2 has a peak coincides with the frequency at which the frequency characteristic of the block A in FIG. 2 has a valley, so that the rotating speed detecting apparatus does not have a peak in its frequency characteristic.

Figure 6:
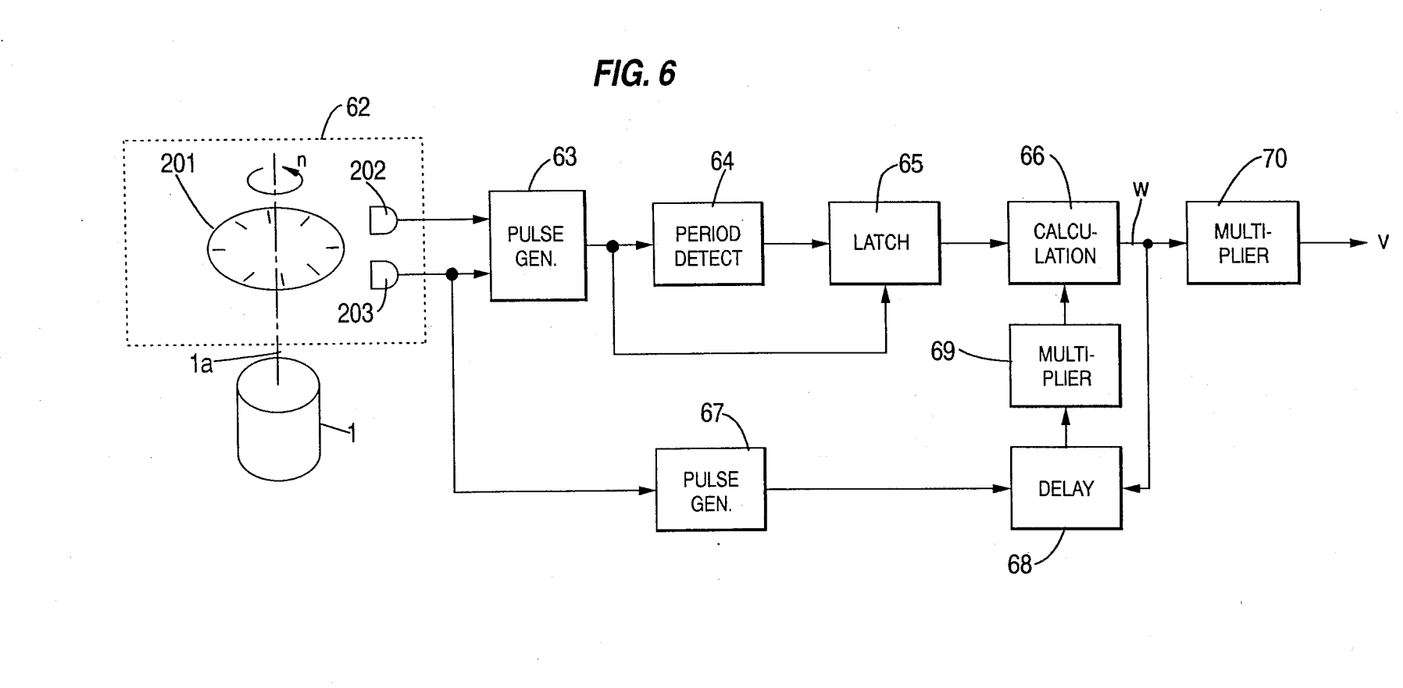
FIG. 6 is a block diagram of another rotating speed detecting apparatus embodying the present invention.

Another embodiment of rotating speed detecting apparatus according to the present invention is shown in FIG. 6.

In FIG. 6, a pulse generating section 62 generates two-phase (the number of phases p=2) pulse trains and is comprised by an encoder 201 which rotates integrally with the rotating shaft 1a of the motor 1, and two photo sensors 202 and 203. The photo sensors 202 and 203 generate the two-phase pulse trains each having a frequency proportional to the rotating speed n of the motor 1. Each one of the two-phase pulse trains has a pulse duty ratio of 0.5 and is different in phase by about 90 degrees from the other. A pulse generating circuit 63 outputs a pulse having a specified amplitude at each leading edge and at each pulse trailing edge of each of the two-phase pulse trains from the photo sensors 202 and 203. A period detecting circuit 64 detects the period of past four cycles of the pulse train generated by the pulse generating circuit 63 (p=2; 2p=4) at each occurrence of a pulse of the pulse train. A latching circuit 65 latches a value of period detected by the period detecting circuit 64 until the next occurrence of an output pulse from the pulse generating circuit 63. A pulse generating circuit 67 generates a pulse of an almost constant amplitude at each leading edge and at each trailing edge of the output pulse train of the photo sensor 203. That is to say, the pulse generating circuit 67 generates a pulse train having a frequency which is two times (k=2) that of the output pulse train of the photo sensor 203. A delaying circuit 68 delays an output of a calculation circuit 66 by one period of the output pulse train of the pulse generating circuit 67. A multiplier 69 multiplies an output of the delaying circuit 68 by a specified coefficient β (β is a real number less than 1). An output of the multiplier 69 is sent to the calculation circuit 66. The calculation circuit 66 substracts the output of the multiplier 69 from the output of the latching circuit 64 to obtain a signal w. A multiplier 70 multiplies the output w of the calculation circuit 66 by a specified coefficient α (α is a real number) for adjusting the detection gain to obtain a signal v which is indicative of the rotating speed n of the motor 1.

In other words, the detection results of the period detecting circuit 64 are processed so that the rate of change of the period is emphasized during the period of the output pulse train of the pulse generating circuit 67 (i.e., differential characteristic is obtained).

Figure 7:
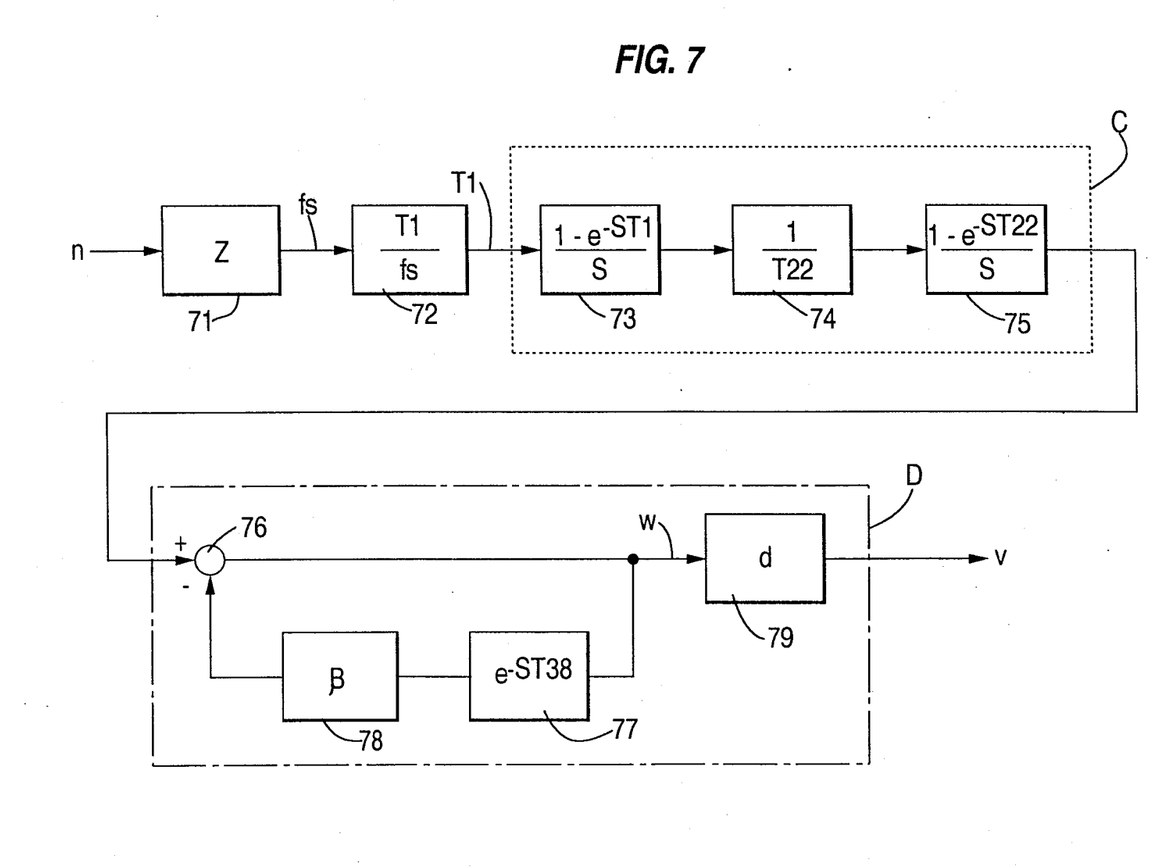
FIG. 7 is a block diagram representing the transfer characteristic of the apparatus of FIG. 6.

In the rotating speed detecting apparatus shown in FIG. 6, the transfer characteristic form the rotating speed n of the motor 1 to the signal v is shown by a block diagram in FIG. 7. Block 71 represents the transfer characteristic of the pulse generating section 62, and block 72 represents the transfer characteristic which converts the frequency into period. Block 73 represents the transfer characteristic of the period detecting action of the period detecting circuit 64. Block 74 represents the transfer characteristic of the sampling operation of the circuit 64. Block 75 represents the transfer characteristic of the latching circuit 65. Block 76 represents the calculation circuit 66. Block 77 represents the transfer characteristic of the delaying circuit 68. Block 78 represents the transfer characteristic of the multiplier 69. Block 79 represents the transfer characteristic of the multiplier 70. The symbol S is the Laplace operator and the symbol Z is the number of teeth of the encoder 201. The frequency fs is the frequency of each of the two-phase pulse trains outputted from the pulse generating section 62. The period T1 is the period of each of the two-phase pulse trains outputted from the pulse generating section 62 and is also the period detected by the period detecting circuit 64. The period T22 is the period of the output pulse train of the pulse generating circuit 63. The period T33 is the period of the output pulse train of the pulse generating circuit 67 and represents the delay time of the delaying circuit 6. The relation among the periods T1, T22 and T33 is expressed as $T1 = 4 \times T22 = 2 \times T33$.

Figure 8A:
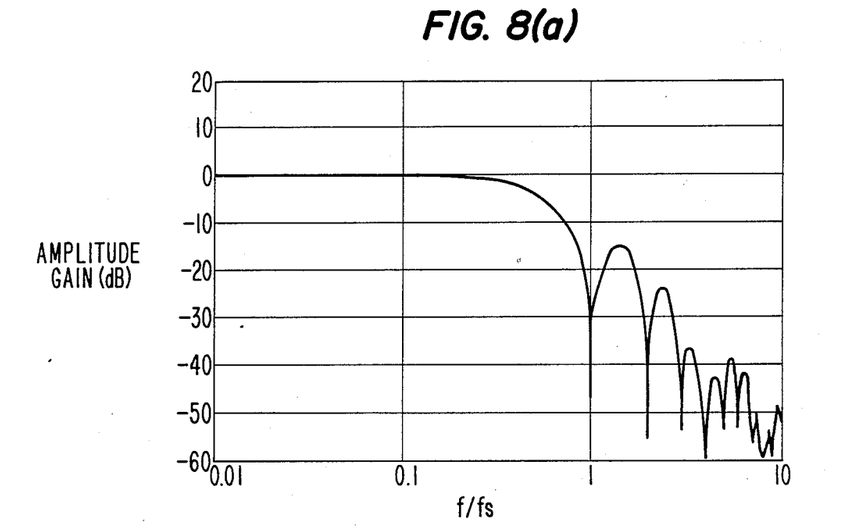
FIGS. 8(a) and 8(b) are Bode plots showing the frequency-response characteristic of block C in FIG. 7.
Figure 8B:
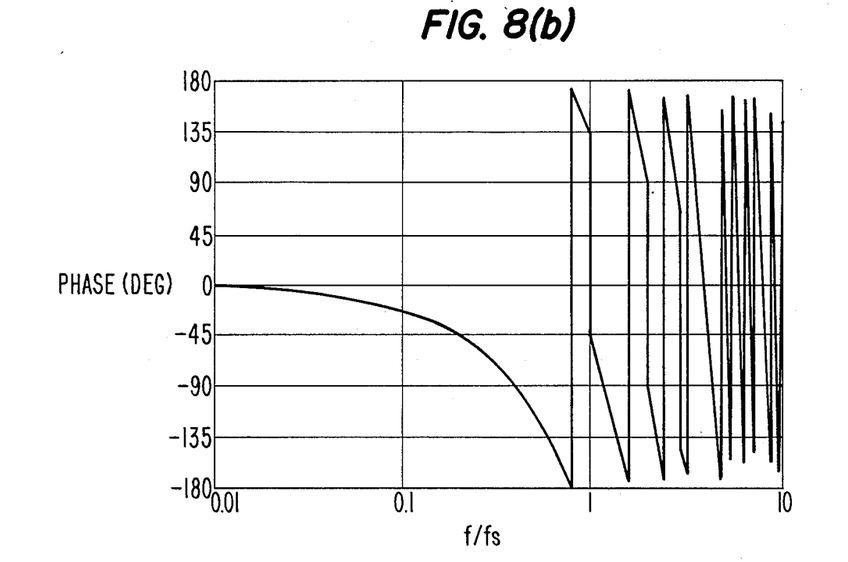

FIG. 8 shows a Bode diagram of the transfer characteristic of a block C consisting of blocks 73–75 in FIG. 7. In FIG. 8, (a) represents an amplitude characteristic and (b) represents a phase characteristic. In FIG. 8, the axis of the abscissa is normalized based on the pulse frequency fs (fs = 1/T1) of the pulse trains generated by the pulse generating section 62. As is apparent from the diagram, the phase delays in the frequency range from the low frequency area to the output pulse frequency fs of the pulse generating section 62 and the amplitude characteristic has a valley at the frequency fs.

Figure 9A:
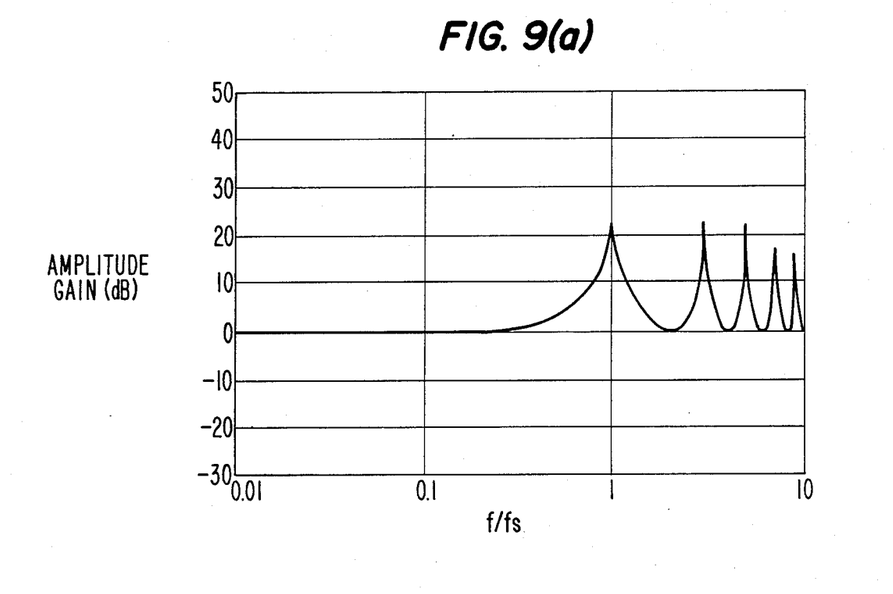
FIGS. 9(a) and 9(b) are Bode plots showing the frequency-response characteristic of block D in FIG. 7.
Figure 9B:
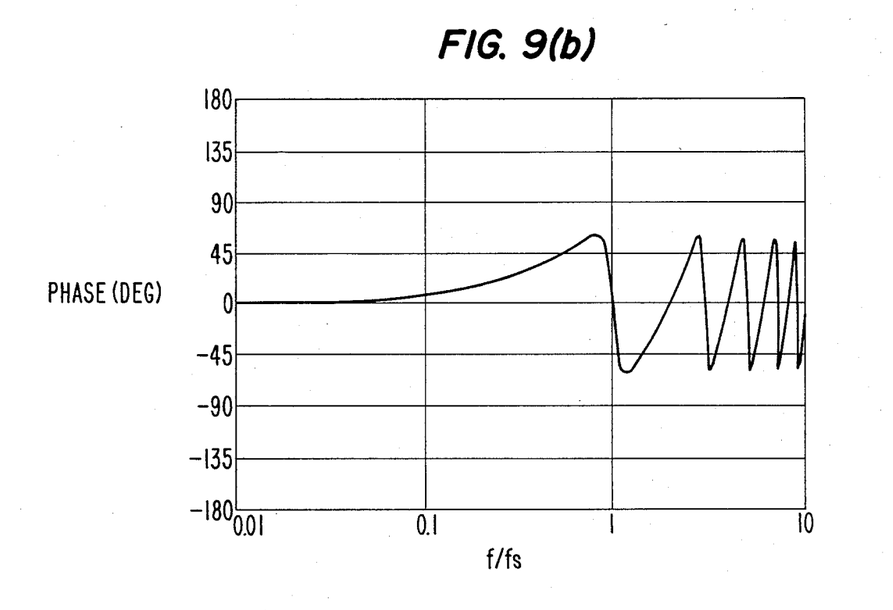

When the coefficients α and β of the multiplier 70 and the multiplier 69 are set as α = 1.75 and β = 0.75, the transfer characteristic of block D consisting of blocks 76–79 in FIG. 7 is shown by a Bode diagram in FIG. 9. In FIG. 9, (a) represents an amplitude characteristic and (b) a phase characteristic. In FIG. 9, the axis of the abscissa is normalized based on the frequency fs (fs = 1/T1). As seen from the Bode diagram in FIG. 9, the amplitude characteristic has a peak at the frequency fs and the phase advances in the frequency range from the low frequency area to the frequency fs. In other words, block D is a kind of recursive filter having a differential characteristic.

Figure 10A:
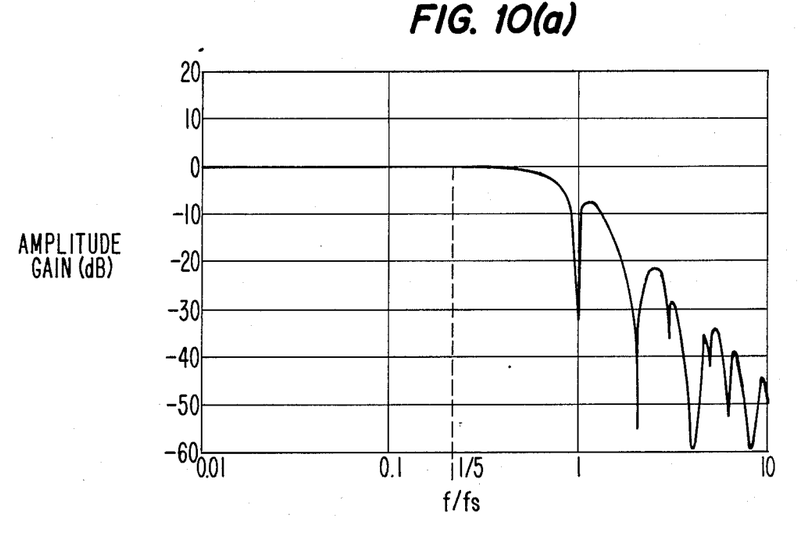
FIGS. 10(a) and 10(b) are Bode plots showing the frequency-response characteristic from T1 to v in the block diagram of FIG. 7.
Figure 10B:
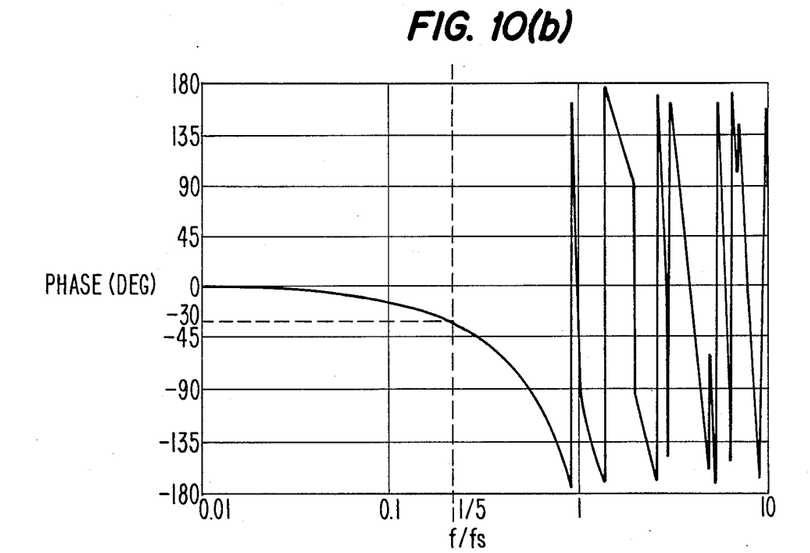

FIG. 10 shows a Bode diagram of the transfer characteristic from the period T1 to the signal v of the rotating speed detecting apparatus shown in FIG. 6. In FIG. 10, (a) represents an amplitude characteristic and (b) a phase characteristic. In FIG. 10 the axis of the abscissa is normalized based on the frequency fs (fs = 1/T1).

From FIG. 10, it is understood that the frequency of the zero point on the frequency characteristic of block C (refer to FIG. 8) conincides with the frequency of the peak on the frequency characteristic of block D (refer to FIG. 9), so that the apparatus has a good frequency characteristic which does not have a peak in the frequency range below fs. It is also understood that in the frequency range equal to or less than 1/5 of the frequency fs (= 1/T1) the phase delay of the rotating speed detecting apparatus becomes 30 degrees or less. In other words, in case the apparatus of this embodiment is to be used to compose a rotation control system, it is possible to widen the controlled frequency range up to 1/5 of the frequency fs (= 1/T1) of the pulse trains generated by the pulse generating section 62 and thus to obtain a high response speed.

Incidentally, in the above embodiment a case where p = 2 and k = 2 is described, but the values of p and k are not limited to 2. Each of the values p and k may be any natural number. However, by using an even number as the value of k, the frequency at which the frequency characteristic of block D in FIG. 7 has a peak conincides with the frequency at which the frequency characteristic of block C in FIG. 7 has a valley, so that the rotating speed detecting apparatus does not have a peak on its frequency characteristic in the frequency range below fs. In case the number of the phases p of the pulse generating section 62 is 3 or more, it is desirable to generate the p-phase pulse trains sequentially with the phase difference of about 180/p degrees.

Furthermore, in an apparatus for detecting the speed of rotation according to the present invention, since the period detecting circuit 64 detects the period of each pulse of the two-phase pulse trains generated by the pulse generating section 62, the detected gain remains unchanged even if the duty ratio or the phase of each of the pulse trains varies, so that stable detection of rotating speed is possible.

What is claimed is:

1. An apparatus for detecting a rotating speed of a rotating object, comprising:
    pulse generating means for generating a pulse train having a frequency proportional to the rotating speed of the rotating object;
    period detecting means, coupled to said pulse generating means, for detecting a period of said pulse train at each occurrence of a pulse of said pulse train;
    latching means, coupled to said period detecting means, for latching a value of said period detected by said period detecting means until a next occurrence of a pulse of said pulse train;
    calculation means, coupled to said latching means, for subtracting a multiplied value from said value latched by said latching means to obtain a signal indicative of the rotating speed of the rotating object;
    delaying means, coupled to said calculation means, for delaying an output of said calculation means for one period of said pulse train; and
    multiplication means, coupled to said delaying means and said calculation means, for multiplying an output of said delaying means by a specified coefficient to obtain said multiplied value, said specified coefficient being a real number having a value which is less than 1.

2. An apparatus for detecting a rotating speed of a rotating object, comprising;

first pulse generating means for generating a first pulse train having a frequency proportional to the rotating speed of the rotating object;

period detecting means, coupled to said first pulse generating means, for detecting a period of said first pulse train;

latching means, coupled to said period detecting means, for latching a value of said period detected by said period detecting means for one period of said first pulse train;

second pulse generating means for generating a second pulse train having a frequency which is m times that of said first pulse train, wherein m is a natural number having a value of at least 2;

calculation means, coupled to said latching means, for subtracting a multiplied value from said value latched by said latching means to output a signal indicative of the rotating speed of the rotating object;

delaying means, coupled to said calculation means and said second pulse generating means, for delaying an output signal of said calculation means for one period of said second pulse train; and multiplication means, coupled to said delaying means and said calculation means, for multiplying an output of said delaying means by a specified coefficient to obtain said multiplied value, said specified coefficient being a real number having a value which is less than 1.

3. An apparatus according to claim 2, wherein m is an even number.

4. An apparatus according to claim 3, wherein the pulse duty ratio of said first pulse train is about 0.5, and said second pulse generating means generates said second pulse train by generating a pulse of almost constant amplitude at each leading edge and at each trailing edge of said first pulse train.

5. An apparatus according to claim 2, wherein the pulse duty ratio of said first pulse train is about 0.5, and said second pulse generating means generates said second pulse train by generating a pulse of almost constant amplitude at each leading edge and at each trailing edge of said first pulse train.

6. An apparatus for detecting a rotating speed of a rotating object, comprising;

first pulse generating means for generating p-phase pulse trains, p being an integer having a value of at least 2, each of said p-phase pulse trains having a duty ratio of about 0.5 and having a frequency proportional to the rotating speed of the rotating object;

second pulse generating means, coupled to said first pulse generating means, for generating a pulse at each leading edge and at each trailing edge of each pulse of said p-phase pulse trains to thereby obtain a combined pulse train;

period detecting means, coupled to said second pulse generating means, for detecting a period of 2 p cycles of said combined pulse train;

latching means, coupled to said period detecting means, for latching a value of said period detected by said period detecting means for one period of said combined pulse train of said second pulse generating means;

calculation means, coupled to said latching means, for subtracting a multiplied value from said value latched by said latching means to obtain a signal indicative of the rotating speed of the rotating object;

third pulse generating means for generating a pulse train having a frequency which is k times that of the frequency of said p-phase pulse trains, wherein k is a natural number;

delaying means, coupled to said calculation means and said third pulse generating means, for delaying an output signal of said calculation means for one period of said pulse train of said third pulse generating means; and multiplication means, coupled to said delaying means and said calculation means, for multiplying an output of said delaying means by a specified coefficient to obtain said multiplied value, said specified coefficient being a real number having a value which is less than 1.

7. An apparatus according to claim 6, wherein said p-phase pulse trains are generated so as to have a phase difference of 180/p degrees.

8. An apparatus according to claim 7, wherein k is an even number.

9. An apparatus according to claim 8, wherein said third pulse generating means generates a pulse of almost constant amplitude at each leading edge and at each trailing edge of one of said p-phase pulse trains to obtain the output pulse train of said third pulse generating means.

10. An apparatus according to claim 7, wherein said third pulse generating means generates a pulse of almost constant amplitude at each leading edge and at each trailing edge of one of said p-phase pulse trains to obtain the output pulse train of said third pulse generating means.

11. An apparatus according to claim 6, wherein k is an even number.

12. An apparatus according to claim 11, wherein said third pulse generating means generates a pulse of almost constant amplitude at each leading edge and at each trailing edge of one of said p-phase pulse trains to obtain the output pulse train of said third pulse generating means.

13. An apparatus according to claim 6, wherein said third pulse generating means generates a pulse of almost constant amplitude at each leading edge and at each trailing edge of one of said p-phase pulse trains to obtain the output pulse train of said third pulse generating means.

* * * * *